3,149,118
EXPANSION OF THE PYRROLE RING TO THE PYRIDINE RING

Phillip S. Landis, Woodbury, N.J., assignor to Socony Mobil Oil Company, Inc., a corporation of New York
No Drawing. Filed Aug. 17, 1962, Ser. No. 217,553
4 Claims. (Cl. 260—283)

This invention relates to the chemical conversion of heterocyclic compounds. It is more particularly concerned with a catalytic method for expanding a pyrrole ring to a pyridine ring.

Compounds containing the pyridine ring, including pyridine, substituted pyridine, and fused ring compound containing a pyridine ring, are widely used as solvents, denaturants for alcohol, and as intermediates in the syntheses of pharmaceuticals, alkaloids, and the like. In many instances the corresponding compounds containing the 5-membered pyrrole ring will be more readily available. In these cases, it would be highly desirable to be able to expand the pyrrole ring to a pyridine ring.

It has now been found that the pyrrole ring can be expanded to a pyridine ring by a relatively simple catalytic process. It has been discovered that, by reaction with methanol in the presence of an acidic refractory oxide catalyst, a compound containing a pyrrole ring can be converted into a compound containing a pyridine ring, together with methylated pyrroles.

Accordingly, it is a broad object of this invention to provide a process for expanding the pyrrole ring to a pyridine ring. Another object is to provide a catalytic process for converting a pyrrole ring into a pyridine ring. A specific object is to provide a catalytic process for converting compounds containing a pyrrole ring into compounds containing a pyridine ring. Other objects and advantages of this invention will become apparent to those skilled in the art, from the following detailed description.

The present invention provides a process for expanding a pyrrole ring to a pyridine ring that comprises contacting a compound containing a pyrrole ring and a molar excess of methanol with an acidic refractory oxide catalyst, at a temperature of between about 300° C. and about 500° C.

The process of this invention is generally applicable to any compound that contains a pyrrole ring. Thus, the process of expanding a pyrrole ring to a pyridine ring can be applied to pyrrole itself and to substituted pyrroles, such as 1-acetyl-pyrrole; 2,4-dimethylpyrrole; 2,5-dimethylpyrrole; 1-ethylpyrrole; 1-methylpyrrole; 2-methylpyrrole; 1-propylpyrrole; and 1-tertiarybutylpyrrole. It is also applicable to fused ring compounds containing the pyrrole ring, such as indole; 1-acetylindole; 2-methylindole; skatole; tryptophan; and indoxyl. Vinylpyrroles and polymeric pyrroles, such as 2,2-dipyrrole, would also ring expand to pyridine derivatives under the reaction conditions of this invention.

Methanol appears to be the only alcohol utilizable in the present process. It has been found that other alcohols, such as ethanol and propanol, under the conditions of the process are dehydrated readily to olefins and thus the necessary intermediates are not available for ring expansion reactions. It is conceivable, however, that alcohols that do not have a beta-hydrogen available for facile olefin formation may be operable.

The amount of methanol used is in molar excess over the amount of pyrrole compound. Relatively large excesses have not been found to hinder the reaction. In many cases large amounts of alcohol can be used to serve, in part, as solvent for the pyrrole compound reactant. Accordingly, the molar ratio of methanol to pyrrole compound reactant can vary between about 2 and about 50 and higher. In preferred practice the molar ratio can vary between about 2 and about 10.

The catalysts utilizable herein are the well-known acidic refractory oxide catalysts. Such catalysts are composites of two or more refractory oxides, which composites are acidic in nature. Generally, this group includes oxides of the metals of Groups IIA, IIIB, and IVA and B of the Periodic Arrangement of the Elements [J. Chem. Educ., 16, 409 (1939)]. The composites of refractory oxides can also contain halogens and other materials which are known in the art as promoters for cracking catalysts. The catalysts can be synthetic composites of refractory oxides, such as silica-alumina, silica-zirconia, silica - alumina - zirconia, silica-alumina-thoria, alumina-boria, silica-magnesia, silica-alumina-fluorine, and the like. The catalysts can also be the acid form synthetic aluminosilicates, i.e., the zeolitic molecular sieves. Naturally-occurring clays and zeolites are contemplated, such as mordenite, montmorillonite, chabazite, etc. Usually the natural clays and zeolites exist in the form of alkali or alkaline earth metal salts. Thus, in order to be effective acidic oxide catalysts, these materials must be acid-treated, using techniques well known to those skilled in the art. The acid catalyst must also be stable at the elevated temperatures used in this process.

The process of this invention can be carried out at temperatures varying between about 200° C. and about 650° C. Preferred temperatures are between about 300° C and about 500° C.

The process of this invention can be carried out at atmospheric pressure. It can, however, be advantageously carried out at super-atmospheric pressures. Pressures of between about 10 p.s.i.g. and about 1000 p.s.i.g. are contemplated. The contact time of reactants with the catalyst, i.e., the liquid hourly space velocity (LHSV), does not appear to be a critical factor. The liquid hourly space velocity can vary between about 0.1 and about 10.

The following examples are illustrative of the process of this invention. Each run was carried out in a vertical heated heat-resistant (Vycor) glass tube reactor. The tube contained a bed of catalyst which, in these runs, was F-10 alumina (Aluminum Company of America). This alumina contains about 0.1 weight percent silica and has a surface area of about 100 square meters per gram. The pyrrole compound reactant dissolved in the methanol was passed downwardly through the heated bed of catalyst at a liquid hourly space velocity of about two.

Example 1

A solution of 30 grams of pyrrole (B.P. 130–131° C.) in 300 ml. of methanol was passed over 30 ml. of F-10 alumina at 540 to 550° C. in three and one-half hours. In the condensing system there was 130 ml. of an aqueous layer consisting primarily of water and methanol but also containing small amounts of low molecular weight amines. An oily layer, 53 grams, was the primary product and was separated from the aqueous layer and dried over anhydrous sodium sulfate, filtered and distilled. Before distillation the oily product was shown to consist of 28 components by vapor phase chromatographic separation using a programmed vapor phase chromatographic unit where the operating conditions were:

10 foot length column of silicone rubber on chromosorb
Initial Temp. 100° C.; Final Temp. 320° C.
He Carrier gas at 40 ml./min.
Programmed at 11° C./minute
Sample size: 2 microliters Because of the complexity of the mixture, 44 grams of the product was distilled with the following results:

| Frac. | B.P., ° C. | Press., mm. | Wt., grams |
|---|---|---|---|
| 1 | 59–63 | atm. | 2.2 |
| 2 | 80–90 | 0.1 | 21.7 |
| 3 | 90–95 | 0.1 | 8.0 |
| 4 | 95–110 | 0.1 | 2.0 |
| 5 | 110–120 | 0.1 | 1.0 |
| Residue | | | 4.0 |
| Dry Ice trap | | | 4.6 |

Frac. 1 consisted of low molecular weight amines
Frac. 2 and Frac. 3 were analyzed by mass spectrometry Frac. 2: | Percent
--- | ---
Polymethylpyrroles | 71
Methylpyridines | 23
Olefins | 5

Frac. 3:
Polymethylpyrroles | 50
Methylpyridines | 25
Methylpyridanes | 18
Olefins | 5

*Example 2*

Using the apparatus and technique previously described, a solution of 23.4 grams of indole in 128 grams of methanol was passed over 30 ml. of F–10 alumina at 450 to 500° C. in three hours. Fifty ml. of benzene was added to the condensate in the ice traps, the benzene solution separated, dried over anhydrous sodium sulfate and the solvent removed on a steam bath under nitrogen. The residue, 33 grams, was distilled under vacuum collecting the following fractions:

| Frac. | B.P., ° C. | Press., mm. | Wt., grams |
|---|---|---|---|
| 1 | 55–85 | 0.08 | 5.03 |
| 2 | 86–89 | 0.08 | 7.86 |
| 3 | 90–104 | 0.08 | 9.53 |
| 4 | 104–119 | 0.08 | 5.14 |
| Residue | | | 2.62 |
| Dry Ice trap | | | 1.82 |

A composite of fractions 1 through 4 was prepared and established as a mixture of 13 components, nine of which were major components. Examination of the composite fraction using mass spectrometry gave the following results:

| | Percent |
|---|---|
| Methylindoles | 67.8 |
| Methyldihydroquinolines | 23.2 |
| Methylquinolines | 7.1 |

*Example 3*

A solution of nine grams of pyrrole in 38 grams of methanol was passed over 30 ml. of F–10 alumina at 300 to 310° C. in three hours. Gaseous products (dimethylether and unidentified low molecular weight products) were vented to the hood. Twenty-four ml. of liquid was collected in the condenser system. Sodium sulfate was added to the solution to facilitate separation of a water-insoluble phase, which was separated, dried and distilled, giving 5 grams, boiling range 40 to 80° C. at 1 mm. Vapor phase chromotographic examination of the distillate established the mixture as 70.10% unreacted pyrrole and 29.90% of six other components. After removal of unreacted pyrrole by distillation, mass spectrometer analysis of the mixture gave the following results:

| | Percent |
|---|---|
| Methylpyrroles | 60 |
| Methylpyridanes | 24 |
| Methylpyridines | 11 |
| Other | 5 |

*Example 4*

A solution of 23 grams of pyrrole and 22 grams of methanol was passed through a bed of 30 ml. of F–10 alumina at 500° C. in 3¼ hours. Twenty-nine ml. of liquid product was condensed in Dry Ice traps. An oil phase, 14 grams, was separated, dried over anhydrous sodium sulfate and filtered. The product was examined by vapor phase chromatography and established as a mixture of at least 11 components. Mass spectrometer analysis of the product gave the following results:

| | Liquid, vol. percent |
|---|---|
| Methylpyrrole | 7.8 |
| Dimethylpyrroles | 23 |
| Trimethylpyrroles | 37 |
| Tetramethylpyrroles | 20 |
| Pentamethylpyrroles | 2.6 |
| Methylpyridanes | 3.2 |
| Methylpyridines | 2.4 |
| Other nitrogen heterocyclic compounds | 3.8 |

Although the present invention has been described with preferred embodiments, it is to be understood that modifications and variations may be resorted to, without departing from the spirit and scope of this invention, as those skilled in the art will readily understand. Such variations and modifications are considered to be within the purview and scope of the appended claims.

What is claimed is:

1. A process for expanding a pyrrole ring to a pyridine ring that comprises contacting a compound containing a pyrrole ring and a molar excess of methanol with an acidic refractory oxide catalyst, at a temperature of between about 200° C. and about 650° C.

2. A process for expanding a pyrrole ring to a pyridine ring that comprises contacting a compound containing a pyrrole ring selected from the group consisting of pyrrole, indole, and alkyl derivatives of pyrrole and indole and between about 2 moles and about 50 moles of methanol per mole of said compound containing a pyrrole ring, with an alumina-silica catalyst, at a temperature of between about 300° C. and about 500° C.

3. The process defined in claim 2, wherein said compound containing a pyrrole ring is pyrrole.

4. The process defined in claim 2, wherein said compound containing a pyrrole ring is indole.

References Cited in the file of this patent
UNITED STATES PATENTS 3,016,373    Saggiomo et al. _____ Jan. 9, 1962

OTHER REFERENCES

Klingsberg: "Pyridine and Derivatives" Part One, pages 226–228 (1960), QD 401 K5.
Emmett: "Catalysis," vol. VII, pages 94 and 103 (1960), QD 501 E 58.
Bergmann: "The Chemistry of Acetylene and Related Compounds," p. 80 (1948), QD305 H8 B44.